United States Patent
Buddington et al.

(10) Patent No.: US 9,851,513 B2
(45) Date of Patent: *Dec. 26, 2017

(54) CRIMP FOR AN OPTICAL CABLE CONNECTOR

(71) Applicant: CommScope Connectivity Belgium BVBA, Kessel-Lo (BE)

(72) Inventors: Geoffrey Buddington, Suffolk (GB); David Cheale, Essex (GB); Jennifer Shaw, Essex (GB)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/940,060

(22) Filed: Nov. 12, 2015

(65) Prior Publication Data

US 2016/0327755 A1    Nov. 10, 2016

Related U.S. Application Data

(63) Continuation of application No. 10/586,710, filed as application No. PCT/GB2005/000090 on Jan. 11, 2005, now Pat. No. 9,188,749.

(30) Foreign Application Priority Data

Jan. 31, 2004    (GB) .................................. 0402187.9

(51) Int. Cl.
    *G02B 6/38*    (2006.01)
    *G02B 6/42*    (2006.01)

(52) U.S. Cl.
    CPC ......... *G02B 6/3887* (2013.01); *G02B 6/3897* (2013.01); *G02B 6/3857* (2013.01); *G02B 6/4248* (2013.01)

(58) Field of Classification Search
    CPC .. G02B 6/3802; G02B 6/3857; G02B 6/3887; G02B 6/3897; G02B 6/3898; G02B 6/4248
    See application file for complete search history.

(56) References Cited

U.S. PATENT DOCUMENTS

| | | |
|---|---|---|
| 6,422,764 B1 | 7/2002 | Marrs |
| 6,431,783 B2 | 8/2002 | Nakajima et al. |
| 6,885,798 B2 | 4/2005 | Zimmel |
| 6,899,467 B2 | 5/2005 | McDonald et al. |
| 7,376,322 B2 | 5/2008 | Zimmel et al. |
| 7,418,181 B2 | 8/2008 | Zimmel et al. |
| 7,593,614 B2 | 9/2009 | Zimmel et al. |

(Continued)

FOREIGN PATENT DOCUMENTS

EP    0862072 A    9/1998

OTHER PUBLICATIONS

International Search Report issued by the European Patent Office, Rijswijk, Netherlands, dated Feb. 24, 2005, for International Application No. PCT/GB2005/000090; 4 pages.

(Continued)

*Primary Examiner* — John M Bedtelyon
(74) *Attorney, Agent, or Firm* — Merchant & Gould P.C.

(57) ABSTRACT

A crimp comprises a hollow crimp body that is open at each end and includes, a first end, a first crushable crimp tube for crimping onto a connector; and at a second end a second crushable crimp tube for crimping onto a cable, the portion of the crimp between the said ends including a recess for engagement by a closure housing.

17 Claims, 2 Drawing Sheets

(56) References Cited

U.S. PATENT DOCUMENTS

| | | |
|---|---|---|
| 7,606,459 B2 | 10/2009 | Zimmel et al. |
| 7,853,112 B2 | 12/2010 | Zimmel et al. |
| 8,023,791 B2 | 9/2011 | Zimmel et al. |
| 8,311,379 B2 | 11/2012 | Zimmel |
| 8,331,753 B2 | 12/2012 | Zimmel et al. |
| 8,346,045 B2 | 1/2013 | Zimmel et al. |
| 8,705,928 B2 | 4/2014 | Zimmel et al. |
| 8,798,428 B2 | 8/2014 | Zimmel et al. |
| 9,188,749 B2 | 11/2015 | Buddington et al. |
| 9,213,159 B2 | 12/2015 | Zimmel et al. |
| 2003/0063869 A1 | 4/2003 | Elkins et al. |
| 2016/0018605 A1 | 1/2016 | Ott et al. |
| 2016/0187604 A1 | 6/2016 | Zimmel et al. |

OTHER PUBLICATIONS

Written Opinion issued by the European Patent Office, Rijswijk, Netherlands, dated Feb. 24, 2005, for International Application No. PCT/GB2005/000090; 8 pages.

International Preliminary Report on Patentability issued by the International Bureau of WIPO, Geneva, Switzerland, dated Jul. 31, 2006, for International Application No. PCT/GB2005/000090; 9 pages.

CRIMP FOR AN OPTICAL CABLE CONNECTOR

This application is a continuation of U.S. patent application Ser. No. 10/586,710, filed Sep. 17, 2008, now U.S. Pat. No. 9,188,749, which is the 371 U.S. National Phase of International Application No. PCT/GB2005/000090, filed Jan. 11, 2005, which claims the benefit of priority from GB Application No. 0402187.9, entitled "A CRIMP FOR AN OPTICAL CABLE CONNECTOR", filed Jan. 31, 2004, the disclosures of which are expressly incorporated herein by reference.

This invention relates to a crimp for an optical cable connector.

There are numerous designs of connectors for optical cables.

Many such designs were developed for use in indoor environments.

In the field of optical cable installations, however, there is a frequent need to connect cables in so-called "outside plant" (OSP) applications. Typically the cables, and the connectors secured thereto, used in OSP applications must withstand high pull forces caused by eg. environmental influences such as wind, snow and other forms of precipitation. Despite this requirement, for various reasons it is often impossible to avoid using the indoor connector designs in OSP applications.

One form of known indoor cable connector 10 is shown in FIG. 1.

The connector 10 includes a connector body 11 defining a hollow interior 12.

A dividing wall (not visible in FIG. 1) divides the hollow interior and provides support for a rearwardly extending, hollow, cylindrical, metal spigot 13. Spigot 13 extends rearwardly from the dividing wall to protrude via an aperture 14 formed in the end of the connector 10 visible in FIG. 1.

The opposite end 16 of the connector 10 includes connector parts intended for mating with other connector components for the purpose of making an optical fibre connection. The precise nature of these connector parts is variable according to the design of connector under consideration. Those skilled in the art will be familiar with the various known connector arrangements.

In order to secure an optical fibre cable 17 to the connector 10 it is necessary to remove a length of the cable jacket 18 from one end of the cable to expose the cable core assembly 19 and the reinforcing fibres 21, which latter typically are Kevlar fibres.

To secure the connector 10 and the cable 17 together it is necessary to insert the cable through a cylindrical, crushable, metal crimp 22 that as shown in FIG. 1 is a parallel-sided, circular hollow cylinder. Typically this step occurs before removal of the cable jacket as described above.

Thereafter the cable core assembly 19 is inserted into the spigot 13 so as to make an optically transmitting contact with the remainder of the operative components of the connector 10. The Kevlar fibres are then placed around the exterior of the spigot 13, and the crimp 22 advanced to trap the Kevlar fibres 21 between the interior of crimp 22 and the exterior of spigot 13.

A final step in the assembly of the connector 10 involves crushing the crimp 22 (eg. using a crimping tool) onto the exposed part of the spigot 13 and the cable jacket 18.

Following these assembly steps, the connector 10 may be inserted into eg. a socket of per se known design. The mating of the connector and socket typically will withstand a tensile load applied longitudinally to the cable 17 of about 40N, before the connector 10 is pulled out of socket.

A connection of this strength is comfortably adequate when the connector 10 is used in indoor environments, but for the reasons stated hereinabove it is potentially inadequate when used in OSP applications.

A solution to this problem proposed in the prior art is to provide, between eg. the connector body 11 and a location on the cable jacket, a strain relieving line or structure. This provides a load transfer path for tensile loads that relieves strain on the connector 10. However, this arrangement is time-consuming to assemble. Consequently it is seriously disadvantageous, for example when an operator has to prepare many tens or hundreds of connectors for use in OSP applications.

Furthermore although it is commonplace for optical cables to be pre-terminated with connectors in a factory environment, sometimes it is necessary to assemble the connectors onto the cables in situ. In harsh or cold weather the need for this activity renders the use of additional, strain-relieving bridging components particularly inconvenient.

According to the invention there is provided a crimp for an optical cable connector, comprising a hollow crimp body that is open at each end and comprises, at a first end, a first crushable crimp tube for crimping onto a connector; and at a second end a second crushable crimp tube for crimping onto a cable, the portion of the crimp between the said ends including a recess for engagement by a closure housing.

The presence of a recess in the body of the crimp permits locating of the crimp in eg. a recess or aperture formed in a cabinet or closure housing wall, such that at least a portion of the wall engages firmly the recess in the crimp body.

When such a crimp is therefore used to connect a cable to a connector, such as connector 10 of FIG. 1, and the connector body is engaged as aforesaid with such a wall, the vicinity of the connector 10 is isolated from strain when a tensile load is applied to the cable, because the strain force transfers via the crimp body to the wall.

Since the crimp of the invention may readily be embodied as a one-piece component, it provides an economical, quick to install and effective way of strengthening optical fibre cable connectors for use in OSP applications.

In a preferred embodiment of the invention, the respective crimp tubes and the aforesaid portion therebetween of the crimp are cylindrical.

This feature makes the crimp of the invention readily manufacturable by per se known machining, cold forging, pressing, or sintering techniques.

Conveniently the diameter of the said portion between the crimp tubes is greater than that of either crimp tube.

This allows for good strength of the crimp in the portion that transfers tensile loads to the wall of the cabinet or closure housing, while permitting the crimps to be manufactured in sizes that permit their ready deformation using crimping tools.

The diameter of an optical cable used in OSP applications typically is greater than that of a cable used in indoor applications. This is primarily because the OSP cable includes a thicker cable jacket and more reinforcing fibres than the indoor version.

The use of a portion of the crimp of greater diameter than the crimp tubes permits the accommodation of comparatively large diameter OSP cables in eg. standard sized apertures in cabinets and closure housings. This avoids a further problem evident in the prior art, of difficulty in accommodating OSP cables in the comparatively small apertures available in such housings for indoor cables.

Conveniently the recess is a groove formed in the periphery of the said portion. More particularly the recess extends about the whole periphery of the said portion.

The foregoing features advantageously facilitate manufacture of the crimp using machine tools. Furthermore, the presence of a peripherally extending groove on the outer surface of a cylindrical crimp body means that the crimp can be applied to the cable and connector, without concern for its orientation. This is because there would be at least a part of the groove available for engagement by the container housing wall regardless of the angular rotation of the crimp.

The invention also resides in a crimp as defined hereinabove having an optical cable (especially a drop cable) inserted therethrough, the crimp tube at the said first end of the crimp being crimped onto the spigot of a connector so as to retain thereon the reinforcing fibres of the optical cable; and the crimp tube at the said second end being crimped onto the exterior of the optical cable.

Additionally the crimp preferably includes a portion of a closure housing received in the said recess so as to prevent relative movement between the crimp and the said closure housing portion. This relieves strain on the connector.

Conveniently the recess lies offset from the longitudinal mid-point of the crimp body.

According to a second aspect of the invention there is provided a method of securing an optical cable to a connector comprising the steps of:
(i) inserting an optical cable through a crimp as defined hereinabove so as to protrude at either end thereof;
(ii) removing the jacket of the optical cable to expose the core and reinforcement fibres thereof;
(iii) inserting the core into a connector spigot;
(iv) arranging the reinforcing fibres about the spigot;
(v) advancing the crimp so that the first crimp tube overlies the spigot and the fibres;
(vi) crimping the first crimp tube onto the spigot so as to retain the fibres on the spigot; and, before or after step (vi),
(vii) crimping the second crimp tube onto the exterior of the cable.

Optionally the method may include the further step of:
(viii) inserting the crimp into an aperture of a recess formed in a closure housing so that a part of the closure housing engages the recess so as to prevent relative movement between the crimp and the closure housing.

There now follows a description of a preferred embodiment of the invention, by way of non-limiting example, with reference being made to the accompanying figures in which.

Figure 2:
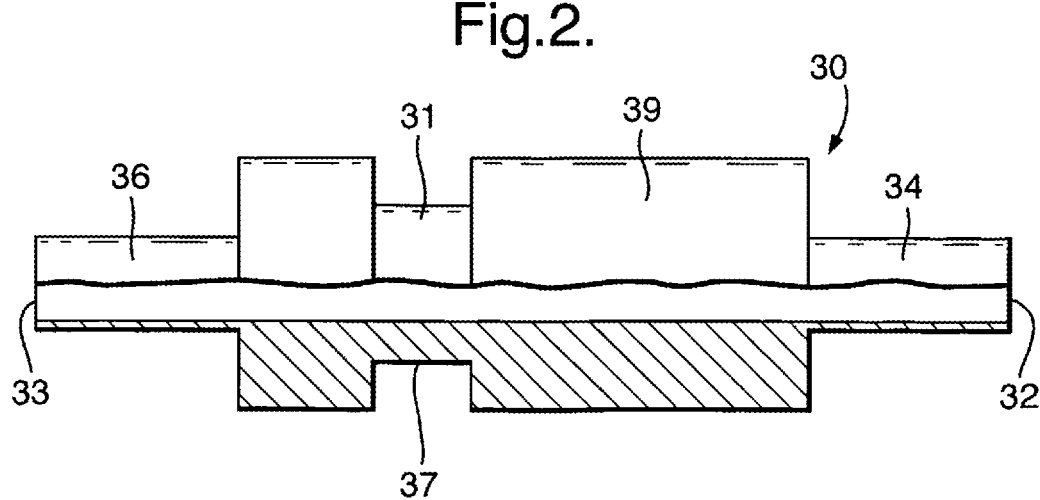
FIG. 2 is a side-elevational, partially longitudinally sectioned view of a crimp according to the invention.
Figure 3:
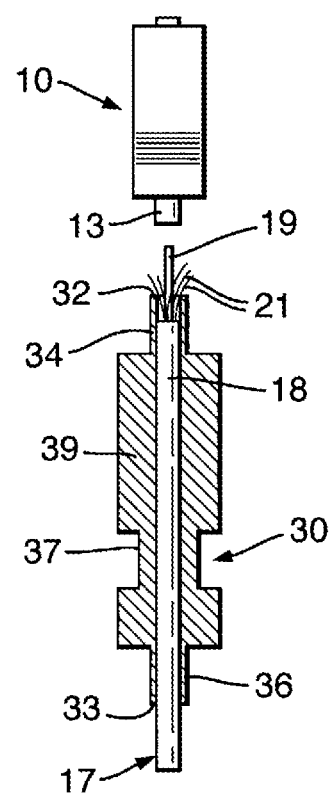
FIG. 3 shows schematically how such a crimp is connectable to a per se known connector.
Figure 4:
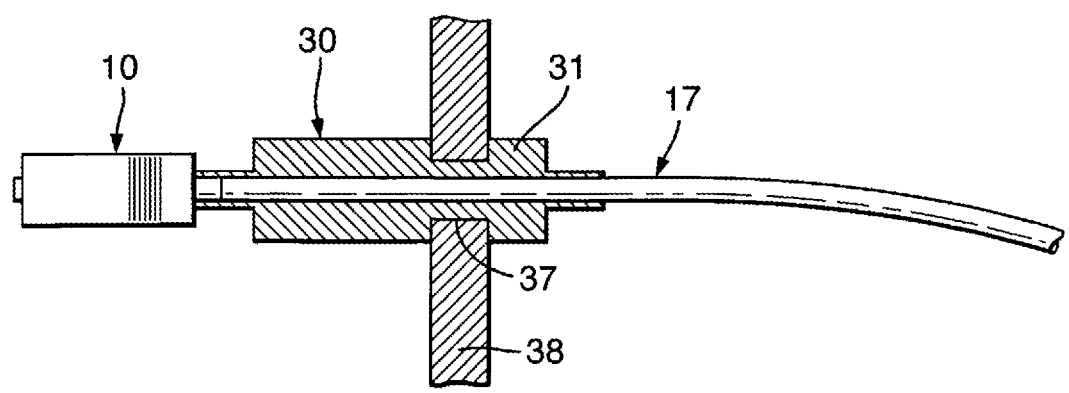
FIG. 4 shows the crimp of FIGS. 2 and 3 connected to a connector, and also illustrates schematically the engagement of a wall with a recess defined in the crimp.

Referring to FIGS. 2 to 4, there is shown a crimp 30 according to the invention.

Crimp 30 is intended for use with an optical cable connector, especially (but not exclusively) an optical drop cable connector.

Crimp 30 includes a hollow, cylindrical crimp body 31 that is formed eg. by machining, pressing, forging or sintering from a metal providing appropriate crimp strength and crushability characteristics.

Any of a range of crushable metals is suitable for use in manufacture of the crimp, including but not limited to Brass and other Copper alloys.

Crimp body 31 is open at each end 32, 33 as best seen in FIGS. 2 and 3.

At first end 32 crimp 30 defines a first, hollow, cylindrical, comparatively thin-walled crushable crimp tube 34. Crimp tube 34 is intended for crimping onto a spigot 13 (FIG. 3) of a connector 10 which is known per se in the prior art.

At second end 33 crimp 30 defines a second hollow, cylindrical, crushable metal crimp tube 36 that is intended for crimping onto the jacket of an optical fibre cable.

The portion of crimp 30 lying between ends 32 and 33 includes a recess 37 that is intended for engagement by a closure housing 38 (FIG. 4).

The portion 39 of the crimp extending between the crimp tube 34, 36 is itself cylindrical.

The diameter of portion 39 is greater than that of either crimp tube 34, 36. In practice the crimp tubes are, as shown by FIG. 2, each of generally the same dimensions as each other.

The recess 37 is in the embodiment shown a groove formed in the periphery of portion 39. The groove is of rectangular-channel cross-section, and as shown by the drawings extends about the whole periphery of the portion 39.

Groove 37 thus is readily formed by machining the cylindrical portion 39 using eg. a lathe or comparable tool.

Recess 37 is offset towards one end of portion 39. This allows for spacing of the engagement location of the crimp 30 with a closure wall 38 away from the vicinity of the connector 10.

As noted herein, a further advantage of forming the recess 37 as an encircling peripheral groove in a cylindrical component is that the crimp 30 may be used without concern for its angular orientation with respect to its longitudinal axis.

FIGS. 3 and 4 show the use of the crimp 30 to connect a cable such as an optical drop cable 17 to a connector 10.

Figure 1:
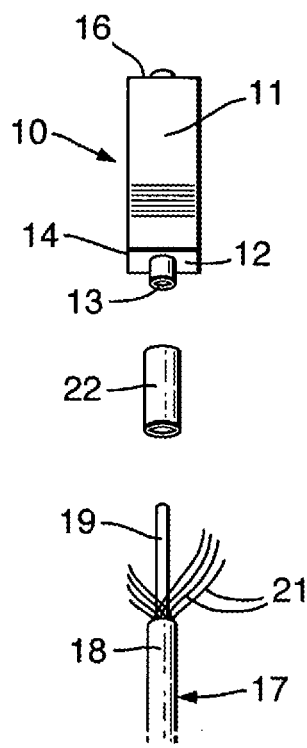
FIG. 1 shows a prior art crimp.

The cable 17 is prepared in the same way as in the prior art (ie. as shown in FIG. 1).

The result of such preparation is for the core assembly 19 of the cable and the reinforcing Kevlar fibres 21 to be exposed a short distance beyond the cut-away cable jacket 18, following threading of the cable through the hollow interior of the crimp 30.

Thereafter it is necessary simply to insert the core assembly 19 into the spigot 13; arrange the reinforcing fibres 21 about the exterior of the spigot 13; advance the crimp tube 34 to encircle the spigot and fibres; crush the first crimp tube 34 onto the spigot 13; and crush the second crimp tube 36 onto the cable jacket 18 at a location spaced a short distance away from the connector 10.

FIG. 4 shows the crimp and connector assembly following completion of such steps.

Subsequently the crimp 30 may be located with its recess 37 received in a further recess, groove or aperture defined in a wall 38 of eg. a container housing or an equipment cabinet.

Longitudinal strain induced in the cable 17 (as signified by the words "cable pull" in FIG. 4) is transferred to the wall 38, thereby isolating the vicinity of the connector 10, the spigot 13 and first crimp tube 34 from such strain.

Consequently the crimp of the invention permits the cable 17 to withstand very significantly greater tensile forces, without causing detachment of the connector 10 from an associated socket, than has been possible using the prior art arrangements. Pull forces of up to 100-150N can readily be resisted.

The invention claimed is:

1. A one-piece crimp for an optical cable connector, the one-piece crimp comprising:
   a hollow body extending from a first open end to a second open end;
   a first crushable crimp tube adjoining the first open end;
   a second crushable crimp tube adjoining the second open end;
   an enlarged portion extending between the first crushable crimp tube and the second crushable crimp tube, the enlarged portion having a dimension greater than that of the crushable crimp tubes; and
   a recess on a periphery of the enlarged portion, wherein the recess is an encircling groove of rectangular-channel cross section.

2. The one-piece crimp of claim 1, wherein the hollow body is cylindrical.

3. The one-piece crimp of claim 1, wherein the first and the second crushable crimp tubes are each cylindrical.

4. The one-piece crimp of claim 3, wherein the first and the second crushable crimp tubes are each of a same diameter.

5. The one-piece crimp of claim 4, wherein the first and the second crushable crimp tubes are each of a same length.

6. The one-piece crimp of claim 1, wherein the recess is positioned nearer to the second crushable crimp tube than the first crushable crimp tube.

7. The one-piece crimp of claim 1, wherein the first crushable crimp tube is configured for crimping onto a spigot of the optical cable connector.

8. The one-piece crimp of claim 1, wherein the first crushable crimp tube is further configured for crimping reinforcing fibers of an optical cable to the spigot of the optical cable connector.

9. The one-piece crimp of claim 1, wherein the second crushable crimp tube is configured for crimping onto an optical cable.

10. The one-piece crimp of claim 1, wherein the recess is configured for engagement by a closure housing.

11. The one-piece crimp of claim 1, wherein the hollow body is configured to receive an optical cable.

12. A method of securing an optical cable to an optical cable connector, the method comprising:
   providing the optical cable;
   providing the optical cable connector;
   providing a one-piece crimp including:
      a hollow body extending from a first open end to a second open end;
      a first crushable crimp tube adjoining the first open end;
      a second crushable crimp tube adjoining the second open end;
      an enlarged portion extending between the first crushable crimp tube and the second crushable crimp tube; and
      a recess on a periphery of the enlarged portion;
   inserting the optical cable through the hollow body so that the optical cable protrudes at the first open end and the second open end; and
   inserting the one-piece crimp into an aperture of a closure housing so that a part of the closure housing engages the recess of the one-piece crimp so as to prevent relative movement between the one-piece crimp and the closure housing.

13. The method of claim 12, further comprising advancing the one-piece crimp so that the first crushable crimp tube overlies a spigot of the optical cable connector.

14. The method of claim 13, further comprising crimping the first crushable crimp tube onto the spigot so as to retain the one-piece crimp on the spigot.

15. The method of claim 14, further comprising:
   prior to crimping the first crushable crimp tube onto the spigot:
      removing a jacket of the optical cable to expose a core and reinforcement fibers thereof;
      inserting the core into the spigot of the optical cable connector; and
      arranging the reinforcement fibers about the spigot.

16. The method of claim 15, further comprising crimping the second crushable crimp tube onto an exterior of the optical cable.

17. An optical cable connector assembly comprising:
   a crimp including:
      a hollow body extending from a first open end to a second open end;
      a first crushable crimp tube adjoining the first open end;
      a second crushable crimp tube adjoining the second open end;
      an enlarged portion extending between the first crushable crimp tube and the second crushable crimp tube; and
      a recess on a periphery of the enlarged portion;
   an optical cable including a jacket, a core, and reinforcement fibers; and
   an optical cable connector including a spigot and a closure housing;
   wherein the reinforcement fibers are arranged about the spigot;
   wherein the first crushable crimp tube overlies and is crimped to the reinforcement fibers and the spigot and thereby retains the reinforcement fibers;
   wherein the second crushable crimp tube is crimped onto an exterior of the jacket of the optical cable;
   wherein an aperture of the closure housing receives the crimp; and
   wherein a part of the closure housing engages the recess of the crimp and thereby prevents relative movement between the crimp and the closure housing.

* * * * *